United States Patent
Kubota et al.

(10) Patent No.: US 8,918,216 B2
(45) Date of Patent: Dec. 23, 2014

(54) ROBOT SYSTEM

(75) Inventors: Yumie Kubota, Fukuoka (JP); Seishiro Sakaguchi, Fukuoka (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 204 days.

(21) Appl. No.: 13/460,841

(22) Filed: May 1, 2012

(65) Prior Publication Data

US 2013/0151010 A1 Jun. 13, 2013

(30) Foreign Application Priority Data

Dec. 13, 2011 (JP) ................................. 2011-272474

(51) Int. Cl.
*G05B 15/00* (2006.01)
*G05B 19/00* (2006.01)

(52) U.S. Cl.
USPC ............ 700/264; 700/245; 700/247; 700/249

(58) Field of Classification Search
CPC ....................................................... B25J 13/06
USPC ........................ 700/264, 245, 247, 249; 901/3
See application file for complete search history.

(56) References Cited

U.S. PATENT DOCUMENTS

| | | | | |
|---|---|---|---|---|
| 6,026,233 | A * | 2/2000 | Shulman et al. | 717/113 |
| 6,324,443 | B1 * | 11/2001 | Kurakake et al. | 700/245 |
| 8,185,846 | B2 * | 5/2012 | Kuwahara et al. | 715/866 |
| 2008/0295083 | A1 * | 11/2008 | Meijer et al. | 717/143 |
| 2009/0241047 | A1 * | 9/2009 | Kuwahara et al. | 715/765 |
| 2010/0017033 | A1 * | 1/2010 | Boca | 700/258 |
| 2010/0125363 | A1 * | 5/2010 | Sakaguchi et al. | 700/248 |

FOREIGN PATENT DOCUMENTS

| | | | |
|---|---|---|---|
| JP | 10-230488 | 9/1998 | |
| JP | 2004-314184 | 11/2004 | |
| JP | 2004314184 A * | 11/2004 | ............... B25J 13/06 |
| JP | 2005-297616 | 10/2005 | |
| JP | 2006-236170 | 9/2006 | |
| JP | 2006-343818 | 12/2006 | |
| JP | 2008-221363 | 9/2008 | |
| JP | 2008221363 A * | 9/2008 | |

OTHER PUBLICATIONS

Japanese Decision of a Patent Grant for corresponding JP Application No. 2011-272474, Mar. 4, 2014.
Japanese Office Action for corresponding JP Application No. 2011-272474, Oct. 29, 2013.
Extended European Search Report for corresponding EP Application No. 12168182.9-1712, Aug. 8, 2014.
Chinese Office Action for corresponding CN Application No. 201210154028.1, Aug. 26, 2014.

* cited by examiner

*Primary Examiner* — Khoi Tran
*Assistant Examiner* — Jorge Peche
(74) *Attorney, Agent, or Firm* — Mori & Ward, LLP (57) ABSTRACT

A robot system includes a robot, a robot controller, and a portable remote operating device. The portable remote operating device includes a display unit, an acquiring unit, and a display switching unit, and is connected to the robot controller. The acquiring unit acquires a reception/transmission process and a customized screen, which are created by a user. The display switching unit switches between the customized screen and a previously-prepared standard screen at a predetermined time during the operation of the robot.

7 Claims, 8 Drawing Sheets

| USER NAME | PASSWORD | SECURITY MODE | STATUS | ... |
|---|---|---|---|---|
| AAAA | aa11 | EDITING | LOGIN | ... |
| BBBBB | abcd | MANAGEMENT | LOGOUT | ... |
| CCC | cd99 | OPERATION | LOGOUT | ... |
| ⋮ | ⋮ | ⋮ | ⋮ | |

FIG.4

| SECURITY MODE | OPERATION PERMISSION | | | | ... |
| | USER MANAGEMENT | JOB EXECUTION | JOB EDITING | ... | |
|---|---|---|---|---|---|
| OPERATION | NO | YES | NO | ... | ... |
| EDITING | NO | YES | YES | ... | ... |
| MANAGEMENT | YES | YES | YES | ... | ... |
| ⋮ | ⋮ | ⋮ | ⋮ | ⋮ | |

ROBOT SYSTEM

CROSS-REFERENCE TO RELATED APPLICATION

This application is based upon and claims the benefit of priority of the prior Japanese Patent Application No. 2011-272474, filed on Dec. 13, 2011, the entire contents of which are incorporated herein by reference.

FIELD

The embodiment discussed herein is directed to a robot system.

BACKGROUND

There is known a conventional portable remote operating device that creates a program for controlling operations of an industrial robot (hereinafter, "teaching") and executes the program created by teaching to cause the industrial robot to work.

For example, an operating device that can select necessary operation items from an operation item list previously prepared to actuate a molding removal device and can register the selected items in a user's own operation menu has been proposed as the portable remote operating device.

As a result, the operating device can register operation items to be frequently used by a user in a user's own operation menu to efficiently actuate the molding removal device.

The conventional technology has been known as disclosed in, for example, Japanese Laid-open Patent Publication No. 2004-314184.

However, the above conventional technology has a problem in that operation items that can be registered in the user's own operation menu are only items that are on an existing operation item list and thus degrees of freedom of the user are restricted.

SUMMARY

A robot system according to an aspect of an embodiment includes a robot, a robot controller, and a portable remote operating device. The robot controller controls an operation of the robot on the basis of teaching data for instructing the robot to perform a predetermined operation. The portable remote operating device includes a display unit, an acquiring unit, and a display switching unit, and is connected to the robot controller. The display unit displays a screen for controlling the operation of the robot, and the acquiring unit acquires a reception/transmission process and a customized screen created by a user. The display switching unit switches the customized screen and a previously-prepared standard screen at a predetermined time during the operation of the robot.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF EMBODIMENT

Hereinafter, a robot system according to an embodiment of the present disclosure will be explained in detail with reference to the accompanying drawings. In addition, the embodiment disclosed below is not intended to limit the present invention.

Figure 1:
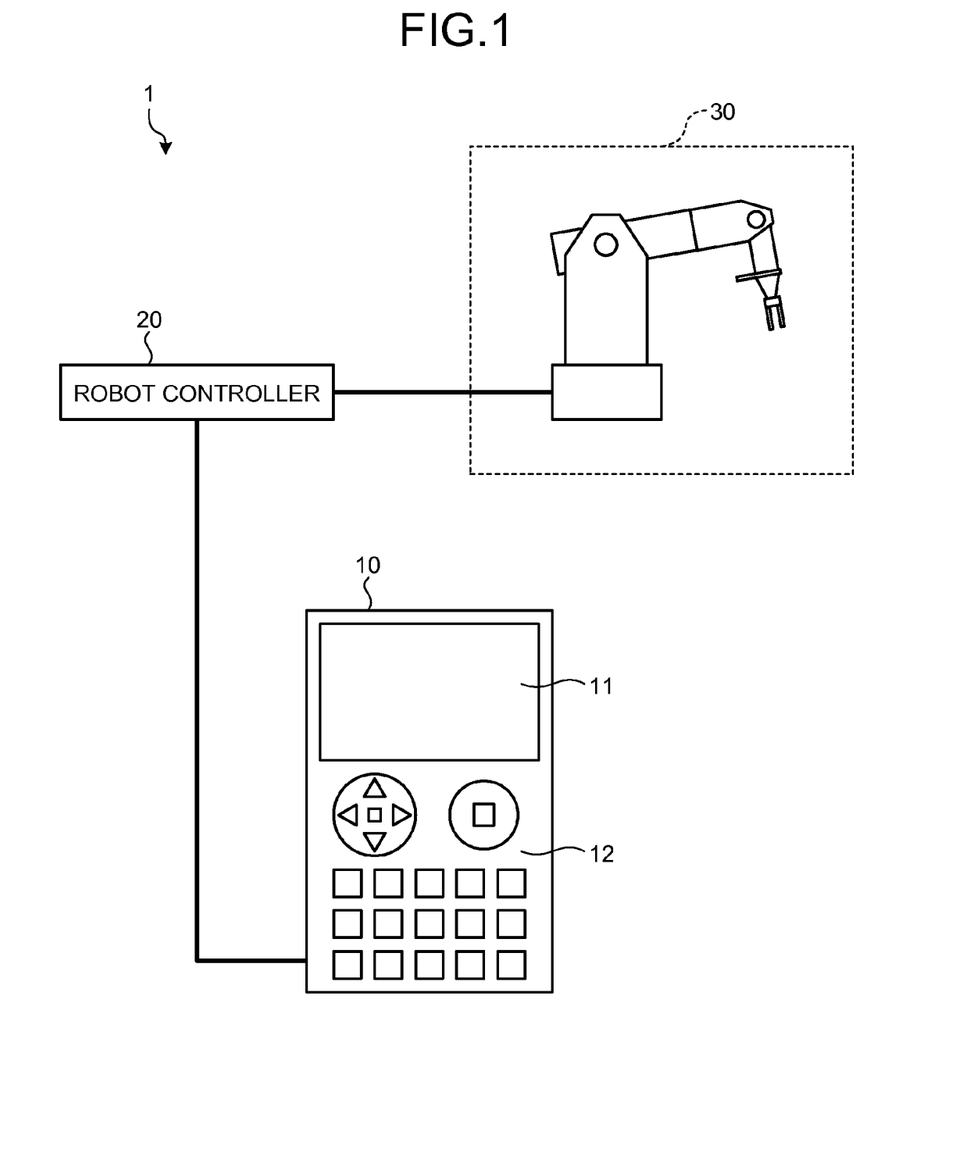
FIG. 1 is an explanation diagram of a robot system according to an embodiment.

First, a robot system 1 according to the present embodiment is explained with reference to FIG. 1. FIG. 1 is an explanation diagram of the robot system 1 according to the present embodiment. In FIG. 1, partial shapes are simplified for easy explanation.

As illustrated in FIG. 1, the robot system 1 according to the present embodiment includes a portable remote operating device 10, a robot controller 20, and a robot 30. Moreover, the portable remote operating device 10 and the robot controller 20 are connected by a cable, for example. Moreover, the robot controller 20 and the robot 30 are connected by another cable, for example.

The portable remote operating device 10 is an input-output terminal for the robot controller 20 that is generally referred to as a teaching pendant. For example, the portable remote operating device 10 is a portable operating device that creates a program for actuating the robot 30 (hereinafter, "teaching"). The portable remote operating device 10 instructs the robot controller 20 to replay teaching data recorded in the robot controller 20 by teaching and makes the robot 30 execute a series of operations.

The portable remote operating device 10 includes a display unit 11 and an operating unit 12. The display unit 11 displays teaching data during teaching, a control state of the robot 30, and the like. The operating unit 12 includes various types of switches and buttons to perform teaching operations and the like.

The robot controller 20 is a control device that controls an operation such as a start and a stop of the robot 30. Moreover, teaching and the replay of teaching data can be performed also by operating various types of switches and buttons provided on the robot controller 20.

The robot 30 is an industrial robot that is called a so-called manipulator. The robot 30 is an apparatus that replays teaching data, which is recorded in the robot controller 20, that is to say, that is previously taught, to perform operations such as welding, gripping and transfer of a workpiece.

Herein, the conventional portable remote operating device can select necessary operation items from an operation item list previously prepared to actuate a robot, register the operation items in a user's own operation menu, and display the operation items on a display unit.

However, because the conventional portable remote operating device can register only items that are on an existing operation item list in the user's own operation menu, degrees of freedom of a user is restricted.

Therefore, the robot system 1 according to the present embodiment can make a user create applications for acquiring status information of the robot controller 20 or reading and writing data. Herein, an application is software that has a function for performing work operations that are executed in the portable remote operating device 10.

Moreover, the robot system 1 according to the present embodiment can make the user independently create customized screens as operation screens for executing the applications. In this way, the robot system 1 according to the present embodiment can improve operationality of a user by raising degrees of freedom of the user. Moreover, the details of the customized screen are explained below with reference to FIG. 5.

The robot system 1 according to the present embodiment can freely switch the present screen to a standard screen that is previously prepared as a general-purpose operation screen even when operations are performed on the customized screen.

In this way, even if some kind of failure occurs during executing the application created by the user, the user can respond to the generated failure by switching over to the standard screen.

Figure 2:
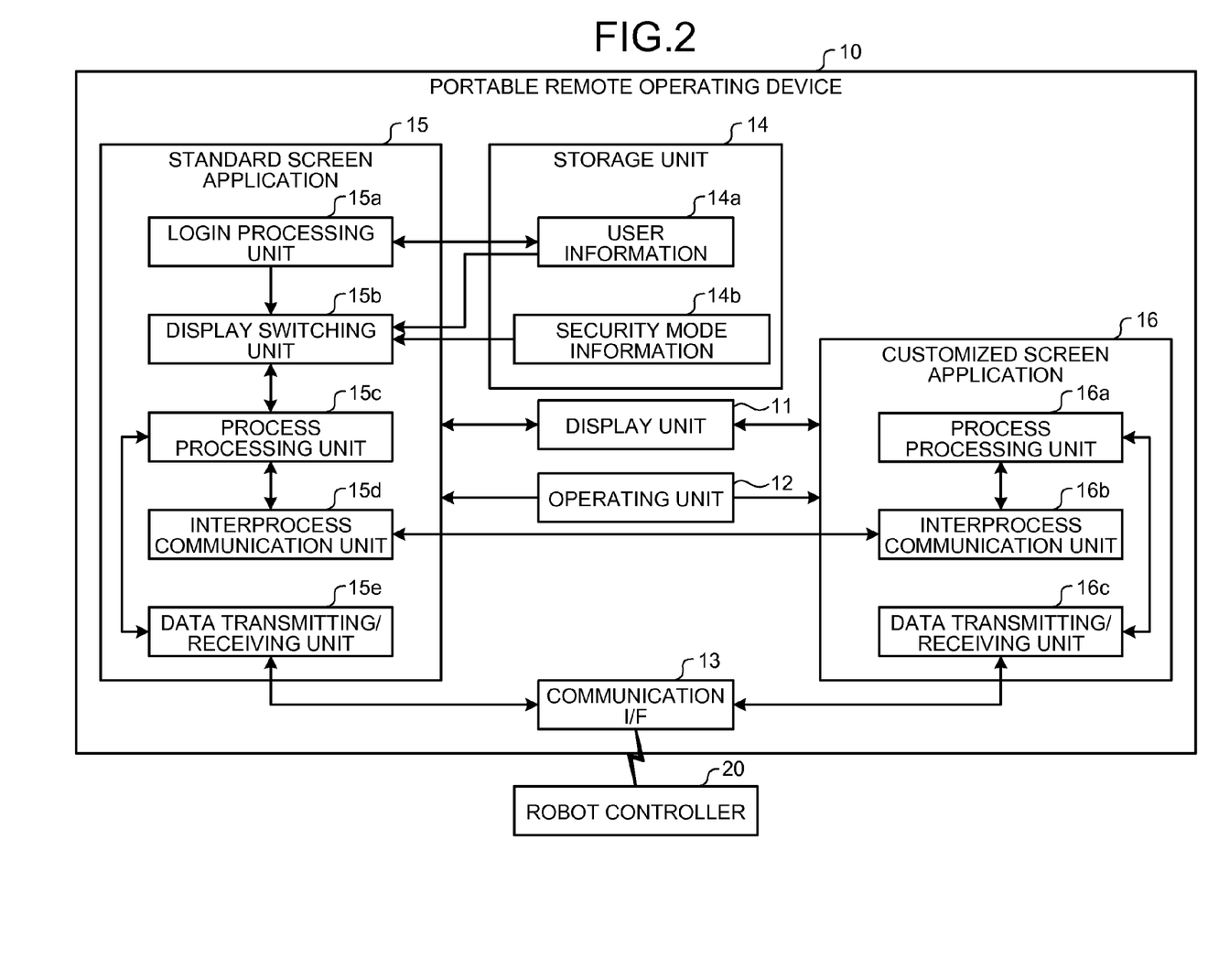
FIG. 2 is a block diagram illustrating the configuration of a portable remote operating device according to the present embodiment.

Next, the details of the configuration of the portable remote operating device 10 according to the present embodiment are explained with reference to FIG. 2. FIG. 2 is a block diagram illustrating the configuration of the portable remote operating device 10 according to the present embodiment.

The portable remote operating device 10 includes the display unit 11, the operating unit 12, a communication I/F (interface) 13, a storage unit 14, a standard screen application 15, and a customized screen application 16.

Each application of the standard screen application 15 and the customized screen application 16 operates on a control unit (not illustrated). In FIG. 2, in order to explain processes of the standard screen application 15 and the customized screen application 16, each application stored in the storage unit 14 is already loaded on the control unit (not illustrated) to be in an executable state.

The standard screen application 15 includes a login processing unit 15a, a display switching unit 15b, a process processing unit 15c, an interprocess communication unit 15d, and a data transmitting/receiving unit 15e. The customized screen application 16 includes a process processing unit 16a, an interprocess communication unit 16b, and a data transmitting/receiving unit 16c. The storage unit 14 stores therein user information 14a and security mode information 14b.

The display unit 11 is a display device that is included in the portable remote operating device 10 to display teaching data and a control state of the robot 30. For example, the display unit 11 is constituted by a liquid crystal display, a speaker, and the like. Moreover, the display unit 11 may be a display that includes a touch panel that can detect a pressing position by using various methods such as a pressure-sensitive type method and a capacitive type method.

The operating unit 12 is an input device that acquires the status information of the robot controller 20 and performs operations for controlling an operation of the robot 30. For example, the operating unit 12 is a keyboard that is configured by various types of switches and buttons. Moreover, the display unit 11 may be used as a part of the operating unit 12 by displaying a software key on the touch panel by using the touch panel of the display unit 11.

The communication I/F 13 is constituted by a communication device that transmits and receives communication data between the portable remote operating device 10 and the robot controller 20. For example, the communication I/F 13 transmits an acquisition request to the robot controller 20 when acquiring the status information of the robot controller 20.

The storage unit 14 is constituted by a storage device such as a random access memory (RAM) and a nonvolatile memory. The storage unit 14 stores therein the user information 14a and the security mode information 14b.

The user information 14a is information on a user that uses the portable remote operating device 10. For example, the user information 14a includes a user name, a password, a status, and the like. When a predetermined user logins to the robot system 1, the portable remote operating device 10 determines whether the received user name and password are registered in the user information 14a to identify the user. When the received user name and password are not preliminarily registered in the user information 14a, the user cannot generally operate the robot system 1.

The security mode information 14b is information on a security mode that indicates a level of authority to be given to a user. For example, the security mode information 14b registers the advisability of permission for each operation item in association with a security mode.

Figure 3:
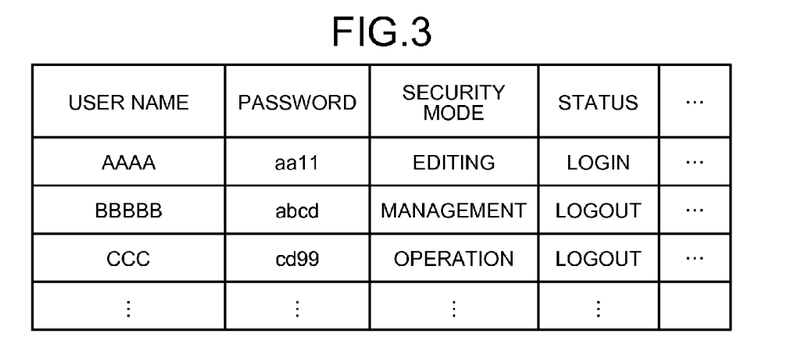
FIG. 3 is a diagram illustrating an example of user information according to the present embodiment.
Figure 4:
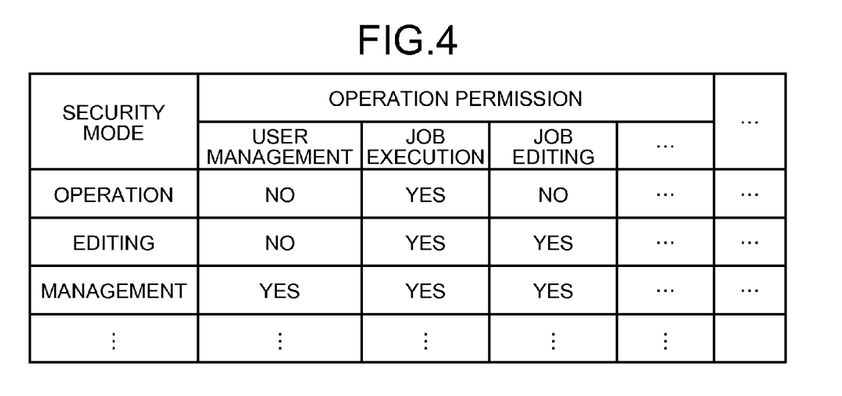
FIG. 4 is a diagram illustrating an example of security mode information according to the present embodiment.

Herein, the details of the user information 14a and the security mode information 14b are explained with reference to FIGS. 3 and 4. FIG. 3 is a diagram illustrating an example of the user information 14a according to the present embodiment. FIG. 4 is a diagram illustrating an example of the security mode information 14b according to the present embodiment.

First, as illustrated in FIG. 3, the user information 14a includes a "user name" item, a "password" item, a "security mode" item, and a "status" item. The "user name" item and "password" item are an identifier for identifying a user.

The "security mode" item is a level of access authority that is previously registered in association with a user. For example, as illustrated in the first line of FIG. 3, a user (user name: AAAA) of which the "security mode" item is registered as "editing" has authority by which "teaching" and "the replay and editing operations of teaching data" can be performed.

As illustrated in the third line of FIG. 3, a user (user name: CCC) of which the "security mode" item is registered as "operation" has authority by which only the replay operation of teaching data can be performed.

The specific user (second-line user name of FIG. 3: BBBBB), which has authority by which the robot system 1 can be managed, previously registers a user name, a password, and a security mode of users that can login to. Moreover, the registration of a user may be performed by the user to be registered.

The "status" item indicates whether the relevant user is presently logging in. More specifically, if a user is logging in, "login" is stored in the "status" item. If a user is not logging in, "logout" is stored in the "status" item.

Next, as illustrated in FIG. 4, the security mode information 14b includes a "security mode" item and an "operation permission" item. The "security mode" item is a security mode registered in the user information 14a and indicates a level of access authority.

The "operation permission" item is information that indicates whether a predetermined operation is permitted in association with the "security mode" item. The advisability of the "operation permission" item is registered for each operation item. For example, as illustrated in the second line of FIG. 4, in association with the "editing" of the "security mode" item, the "user management" of the "operation permission" item has "NO" and "job execution" and "job editing" have "YES". Moreover, a job indicates an executable unit when teaching data is replayed.

If the "security mode" is "editing", this indicates that operation authority for the operation item "user management" is not given and that operation authority for the operation items "job execution" and "job editing" is given.

Returning to FIG. 2, the configuration of the portable remote operating device 10 is continuously explained. The standard screen application 15 is an application that performs a process associated with a standard screen 60 that is previously provided at the time of shipping the portable remote operating device 10.

More specifically, the standard screen application 15 performs a process such as login and display switching that is performed on a customized screen 50 created by a user and the standard screen 60 and also performs a process for monitoring processes of the customized screen application 16.

Figure 5:
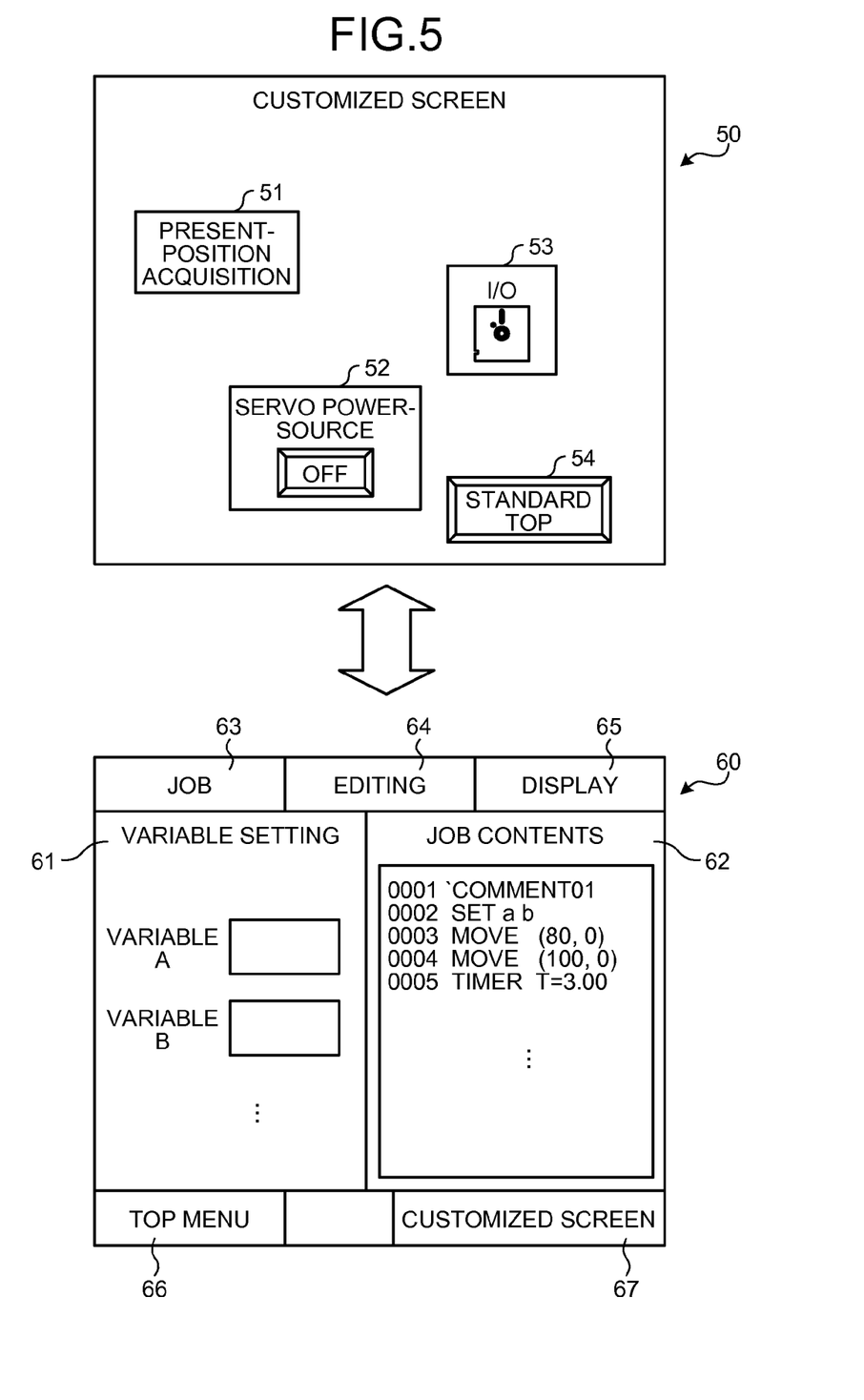
FIG. 5 is a diagram illustrating an example of a switching screen according to the present embodiment.

Herein, the details of the customized screen 50 and the standard screen 60 are explained with reference to FIG. 5. FIG. 5 is a diagram illustrating an example of switching screens according to the present embodiment. In FIG. 5, the upper side indicates the customized screen 50 and the lower side indicates the standard screen 60.

In the robot system 1, a user can create applications for acquiring the status information of the robot controller 20 and for reading and writing data. Moreover, as an operation screen for executing the applications, the customized screen 50 as illustrated in the upper side of FIG. 5 can be independently created by the user.

For example, as illustrated in the upper side of FIG. 5, the customized screen 50 displays icons or one-touch buttons of a present-position acquisition icon 51, a servo power-source OFF icon 52, an I/O icon 53, and a standard TOP button 54 on predetermined display areas.

The icons and one-touch buttons are associated with the applications created by the user. Moreover, similarly to an icon, a one-touch button is an operation button to which specific function and operation are previously assigned.

For example, an application for switching the present display screen to a top menu screen of the standard screen 60 is assigned to the standard TOP button 54. Herein, when the standard TOP button 54 is clicked by the user, the portable remote operating device 10 switches the present display screen to the top menu screen of the standard screen 60 and displays the top menu screen on the display unit 11. An application for acquiring the present positions of various driving units such as a servo mechanism provided in the robot 30 and a base for totally moving the robot 30 is assigned to the present-position acquisition icon 51. Although it is omitted in FIG. 5, an area for displaying the acquired present positions on the display unit 11 may be provided in addition to the icons and the one-touch buttons.

An application for turning off the power source of the servo mechanism of the robot system 1 is assigned to the servo power-source OFF icon 52. Herein, a servo mechanism is a mechanism that automatically operates to follow up a target value by using a position, an orientation, and a posture of an object as a controlled variable. Although it is not illustrated, the servo mechanism is constituted by servo motors that are mounted on the robot 30 to drive shafts and servo amplifiers that are provided in the robot controller 20.

An application for performing a data input-output process by using a plurality of input-output methods is assigned to the I/O icon 53. For example, an input-output process is a process for selecting any method from a plurality of methods such as data input-output into and to an external storage medium such as FD (Floppy (registered trademark) Disk) and USB (Universal Serial Bus) memory, data input-output performed via a network, and the like, and for reading or writing predetermined data.

Moreover, the icons independently created by the user on the customized screen 50, such as the servo power-source OFF icon 52 and the I/O icon 53, can be also displayed on the display unit 11. Moreover, the customized screen illustrated in FIG. 5 is only an example. Therefore, when creating a customized screen, the user can freely set a layout such as the design, the arrangement, and the size of icons and one-touch buttons.

In this way, the robot system 1 according to the present embodiment can make a user independently create the customized screen 50 and further can easily operate applications created by the user. As a result, operationality of a user can be improved by raising degrees of freedom of the user.

Next, as illustrated in the lower side of FIG. 5, the standard screen 60 is a screen that is previously provided at the time of shipping the portable remote operating device 10. Generally, the standard screen 60 is provided with operation items for executing general-purpose processes.

For example, the upper portion of the standard screen 60 displays submenu buttons of a job 63, an editing 64, and a display 65 and the lower portion of the standard screen 60 displays one-touch buttons of a TOP menu button 66 and a customized screen button 67, on predetermined display areas. Moreover, the central portion of the standard screen 60 has the divided two areas that are a variable setting area 61 on which the setting of predetermined variables is performed and a display area 62 on which job contents namely predetermined teaching data are displayed.

A function for displaying a submenu by which a predetermined job is executed is assigned to the job button 63. When the job button 63 is clicked by the user and further a desired job is selected from the submenu, the portable remote operating device 10 displays teaching data of the job to be executed on the display area 62 related to job contents. Moreover, the portable remote operating device 10 displays an execution button (not illustrated) of a job associated with a function for starting the job.

A function for displaying a submenu by which an editing process of teaching data is executed is assigned to the editing button 64. When the editing button 64 is clicked by the user and further a desired job is selected from the submenu, the portable remote operating device 10 displays teaching data, which is an editing target, on the display area 62 related to job contents to be able to be edited. Then, the user can perform editing, change, and updating processes on teaching data on the display area 62 related to job contents.

A function for displaying a submenu by which a predetermined job is displayed is assigned to the display button 65. When the display button 65 is clicked by the user and further a desired job is selected from the submenu, the portable remote operating device 10 displays teaching data, which is a display target, on the display area 62 related to job contents as read only. A function for switching the present screen to the top menu screen of the standard screen 60 is assigned to the TOP menu button 66.

An application for switching the present screen to the customized screen 50 is assigned to the customized screen button 67. The portable remote operating device 10 switches between the standard screen 60 that is previously provided as a general-purpose screen and the customized screen 50 that is independently created by the user, when the customized screen button 67 is clicked by the user.

Returning to FIG. 2, the configuration of the portable remote operating device 10 is continuously explained. When a predetermined user logs in, the login processing unit 15a is a processing unit that retrieves the user information 14a and performs an identification process on the user.

More specifically, the login processing unit 15a determines whether the user name and password received from the operating unit 12 are registered in the user information 14a. Then, when the received user name and password is registered in the user information 14a, the login processing unit 15a permits the user to use it.

Furthermore, when it is determined that the use of the user is permitted, the login processing unit 15a updates the status of the user information 14a stored in association with the user name of the user to "login" and instructs the display switching unit 15b to display an initial screen.

An initial screen is a screen that is displayed by the display switching unit 15b on the display unit 11 at login. The initial screen may be the standard screen 60 or may be the customized screen 50. Moreover, it can be previously set which screen is used as an initial screen for each user. On the other hand, when a display instruction for an initial screen is received from the login processing unit 15a, the display switching unit 15b displays a preset initial screen on the display unit 11.

When the user that is logging in logs out, the login processing unit 15a updates the status of the user information 14a stored in association with the user name of the user from "login" to "logout".

The display switching unit 15b is a processing unit that performs a process for switching between the customized screen 50 and the standard screen 60 and displaying the switched screen on the display unit 11 when a switching request of the screen is received. More specifically, when a switching operation to the standard screen 60 is received from the customized screen application 16 via the interprocess communication unit 15d, the display switching unit 15b switches the customized screen 50 to the standard screen 60 and displays the switched screen on the display unit 11.

When the effect that anomaly is detected during performing the process on the customized screen 50 is received from the process processing unit 15c, the display switching unit 15b forcibly switches the present screed to the standard screen 60 and displays the standard screen on the display unit 11.

In this case, the display switching unit 15b reports the effect that the present screen is forcibly switched to the standard screen 60 to the display unit 11 and then performs switching to the standard screen 60. Moreover, the details of a screen switching process performed by the display switching unit 15b are explained below with reference to FIG. 9.

The process processing unit 15c is a processing unit that performs a process accompanied with the execution of the standard screen application 15 and monitors whether a process on the customized screen 50 operates normally. Herein, a process is a program that is loaded on a memory area assigned from an operating system (OS) to be executed.

More specifically, when a click operation of the job button 63 is received from the operating unit 12, the process processing unit 15c hands operation instructions included in teaching data, by which the robot 30 is actuated, to the data transmitting/receiving unit 15e. After that, the data transmitting/receiving unit 15e transmits the received operation instructions to the robot controller 20 via the communication I/F 13. The robot controller 20 actuates the robot 30 in accordance with the received operation instructions.

The process processing unit 15c receives the control state of the robot 30, and displays the control state on the display unit 11 if desired. For example, when the robot 30 is a robot that performs arc welding, the data transmitting/receiving unit 15e receives data, such as a welding voltage and a welding current that is output from a welding power source (not illustrated) as the control state of the robot 30, from the robot controller 20 via the communication I/F 13. Then, the process processing unit 15c receives the data such as a welding voltage and a welding current received by the data transmitting/receiving unit 15e and displays the data on the display unit 11.

The welding power source is connected to the robot controller 20 to supply a welding power to a welding torch and a workpiece. The robot controller 20 acquires data such as a welding voltage and a welding current supplied from the welding power source during welding. The robot controller 20 transmits the data to the portable remote operating device 10.

The process processing unit 15c detects anomaly of a process executed by the customized screen application 16 as a process monitoring process. More specifically, the process processing unit 15c monitors whether the process on the customized screen 50 operates normally on the basis of predetermined status information that is regularly received from the customized screen application 16 by way of the interprocess communication unit 15d.

Therefore, when the anomaly of the process executed by the customized screen application 16 is detected, the process processing unit 15c informs the display switching unit 15b of that effect. After that, the display switching unit 15b forcibly switches the present screen to the standard screen 60.

The interprocess communication unit 15d is a processing unit that performs transmission and reception of data between the standard screen application 15 and the customized screen application 16. For example, when the customized screen application 16 receives the switching operation to the standard screen 60 from the display unit 11, the interprocess communication unit 15d receives the switching request to the standard screen 60 by way of the interprocess communication unit 16b of the customized screen application 16.

The data transmitting/receiving unit 15e is a processing unit that transmits and receives various types of data to and from the robot controller 20 or the robot 30. For example, the data transmitting/receiving unit 15e transmits predetermined operation instructions, of which the operation is executed by the robot 30, to the robot controller 20 via the communication I/F 13. The robot controller 20 actuates the robot 30 in accordance with the received operation instructions.

The customized screen application 16 is a user-created application that performs a process that is associated with the customized screen 50 created by the user.

Herein, the customized screen application 16 stored in the storage unit 14 is already loaded on the control unit (not illustrated) to be in an executable state. However, the customized screen application 16 created by the user is installed by the control unit by way of the communication I/F 13 and is stored in the storage unit 14. Moreover, this point is explained below with reference to FIG. 6. In the present embodiment, the communication I/F 13 corresponds to an acquiring unit.

For example, when the customized screen application 16 detects that the present-position acquisition icon 51 of the customized screen 50 is clicked by the user, the customized screen application 16 executes an application for acquiring the present position of a servo mechanism that is assigned to the present-position acquisition icon 51.

The process processing unit 16a is a processing unit that executes a process accompanied with the execution of the customized screen application 16. For example, along with the acquisition of the present position of the servo mechanism by the customized screen application 16, the process processing unit 16a hands the acquisition request of the present position of the servo mechanism to the data transmitting/receiving unit 16c.

After that, the data transmitting/receiving unit 16c transmits the acquisition request of the present position of the servo mechanism to the robot controller 20 via the communication I/F 13. On the other hand, the robot controller 20 transmits the present position of the servo mechanism to the data transmitting/receiving unit 16c via the communication I/F 13 in accordance with the received acquisition request.

The process processing unit 16a displays the present position of the servo mechanism received via the data transmitting/receiving unit 16c on the display unit 11. The interprocess communication unit 16b is a processing unit that performs data transmission and data reception between the process on the customized screen 50 and the standard screen 60.

The data transmitting/receiving unit 16c is a processing unit that transmits and receives various types of information to and from the robot controller 20 or the robot 30. For example, the data transmitting/receiving unit 16c transmits an instruction for turning off the power source of the servo mechanism provided in the robot 30 to the robot controller 20 via the communication I/F 13. The robot controller 20 turns off the power source of the servo mechanism in accordance with the received instruction.

Figure 6:
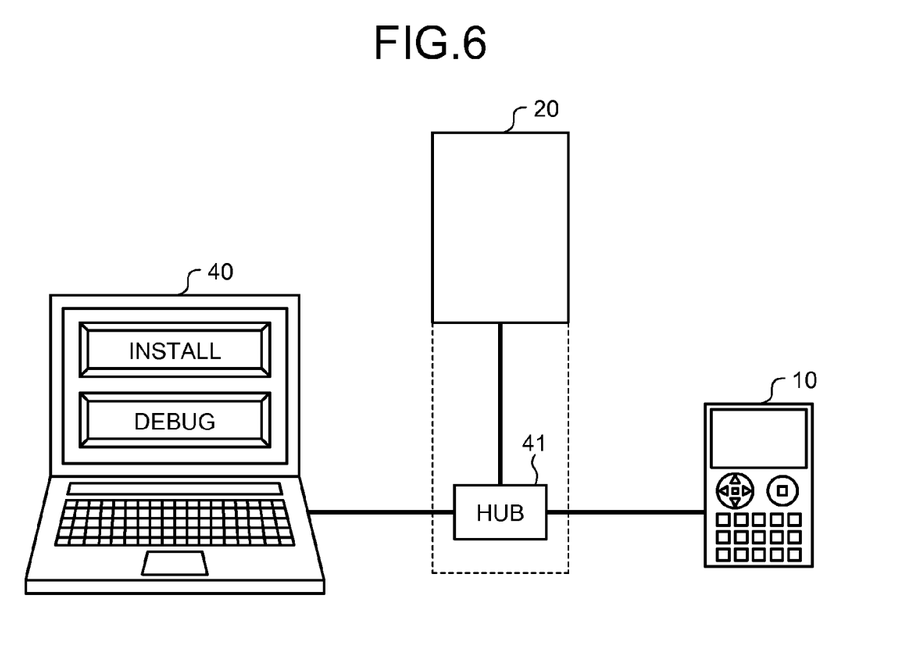
FIG. 6 is a diagram illustrating a configuration example of an apparatus according to the present embodiment.

Next, the details of a creation method of an application that is executed by the portable remote operating device 10 according to the present embodiment is explained with reference to FIG. 6. FIG. 6 is a diagram illustrating an example of a device configuration according to the present embodiment.

An example of the device configuration in which a user creates an application and performs a debug on the application is illustrated in FIG. 6. As illustrated in FIG. 6, the robot system 1 according to the present embodiment includes the portable remote operating device 10, the robot controller 20, a personal computer 40 for development, and an HUB 41.

The portable remote operating device 10, the robot controller 20, and the personal computer 40 for development are connected to the HUB 41 by using a cable, and communicate with each other via the HUB 41 by using Ethernet (registered trademark) that is one of network standards for LAN (local area network). Moreover, the HUB 41 is a line concentrator that is located at the center of the network.

Herein, in the case of application development, it is assumed that the portable remote operating device 10, the robot controller 20, and the personal computer 40 for development are connected to each other by using the HUB 41. However, as illustrated by the dotted line of FIG. 6, the present embodiment has a configuration that the robot controller 20 includes therein the HUB 41 to perform communication in accordance with the Ethernet (registered trademark) standard via a cable that connects the portable remote operating device 10 and the robot controller 20.

By employing such a configuration, application development can be performed only by connecting the personal computer 40 for development to the HUB 41 in the robot controller 20.

The personal computer 40 for development is a computer for a user to develop an application. The personal computer 40 for development can create an application, debug the created application, and install the application on the portable remote operating device 10.

For example, as illustrated in FIG. 6, when an installation button is clicked by the user from on a screen of the personal computer 40 for development, the personal computer 40 for development transmits the corresponding application to the portable remote operating device 10 by way of the HUB 41.

Then, the portable remote operating device 10 receives the application transmitted from the personal computer 40 for development by way of the communication I/F 13, and stores the received application in the storage unit 14 to install it.

When a debug button on the screen of the personal computer 40 for development is clicked by the user, the personal computer 40 for development transmits a debug application including debug information to the portable remote operating device 10, and the storage unit 14 stores the debug application. The debug application has a function for communicating with the personal computer 40 for development in addition to an original application function. The personal computer 40 for development performs a debug operation on the debug application to debug whether the application installed on the portable remote operating device 10 operates normally.

When the application is installed, the personal computer 40 for development may not be necessarily connected to the robot controller 20. For example, when an application is created by the personal computer 40 for development that is not connected to the robot controller 20, the application is accompanied with an installer that installs the application on the portable remote operating device 10.

Furthermore, a slot or a terminal for inserting a medium such as Compact Flash (registered trademark) and USB memory into the portable remote operating device 10 is provided and the created application and the installer are copied in the medium. If the user performs a predetermined operation on the portable remote operating device 10 in the state where the medium is inserted into the portable remote operating device 10, the application can be installed.

According to such the configuration, an application can be installed without carrying the personal computer 40 for development to the place in which the robot controller 20 is actually provided.

It has been explained that the display switching unit 15b switches between the customized screen 50 and the standard screen 60 at a predetermined time and displays the switched screen on the display unit 11. However, the present embodiment is not limited to this. For example, the display switching unit 15b may switch display/nondisplay for an operation item on the basis of a security mode associated with a user during login.

Figure 7A:
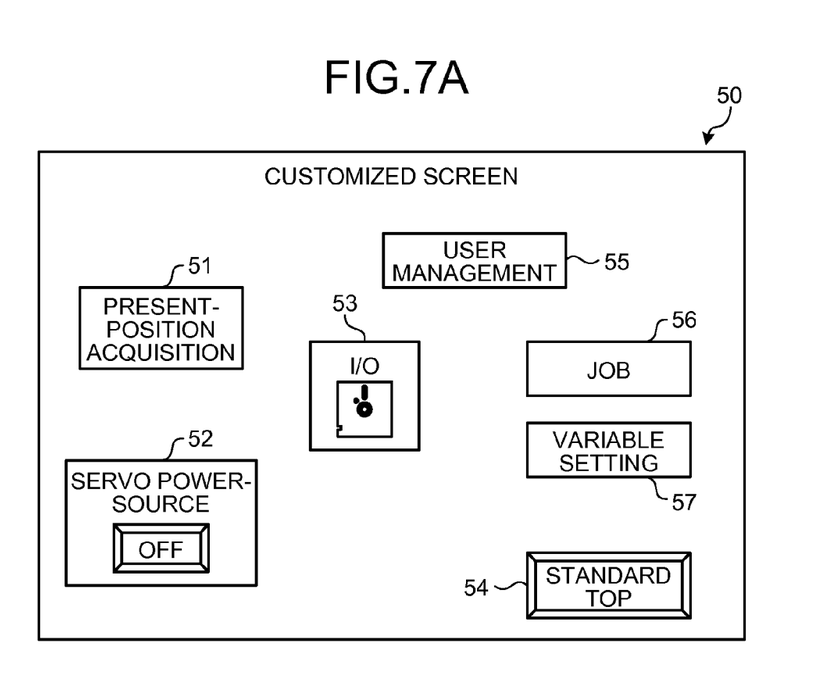
FIGS. 7A and 7B are diagrams illustrating an example of an operation item display according to the present embodiment.
Figure 7B:
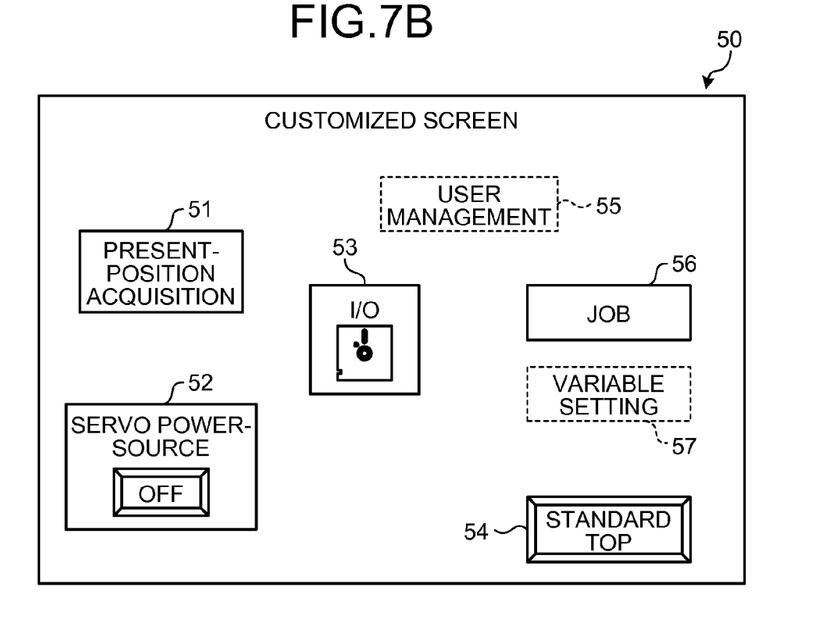

Next, the details of a display switching process on operation items performed by the display switching unit 15b are explained with reference to FIGS. 7A and 7B. FIGS. 7A and 7B are diagrams illustrating an example of an operation item display according to the present embodiment.

First, it is assumed that a security mode associated with a user during login is "management", that is to say, the authority of a robot system administrator is given to the user. Moreover, it is assumed that the security mode information 14b registers "YES" in all the "operation permission" items of the operation items of the customized screen 50 when the security mode is "management".

In this case, as illustrated in FIG. 7A, the display switching unit 15b displays all the operation items created by the user on the customized screen 50 and thus the user can use all the operation items.

On the other hand, when the security mode associated with a user during login is "editing", the security mode information 14b registers "YES" in the "operation permission" items corresponding to the "present-position acquisition icon 51", the "I/O icon 53", and a "job icon 56" of the operation items.

In this case, as illustrated in FIG. 7B, the display switching unit 15b displays the "present-position acquisition icon 51", the "I/O icon 53", the "job icon 56", and the "standard TOP button 54" of the operation items on the customized screen 50.

The display switching unit 15b switches, to nondisplay, a "user management icon 55" and a "variable setting icon 57" that are operation items of which the "operation permission" items have "NO". It has been explained that the display switching unit 15b switches between display and nondisplay. An operation for the icon or button of an operation item may be switched between validity and invalidity.

Moreover, the display switching unit 15b may switch the icon or button of an operation item between display and nondisplay by using an operation mode in addition to the security mode described above. Moreover, the operation mode includes a "play" mode and a "teaching" mode. The "play" mode is a mode for replaying the teaching data and causing the robot 30 to perform a predetermined operation. Moreover, the "teaching" mode is a mode for creating and editing a program, namely, teaching data that controls the operations of the robot 30.

Figure 8:
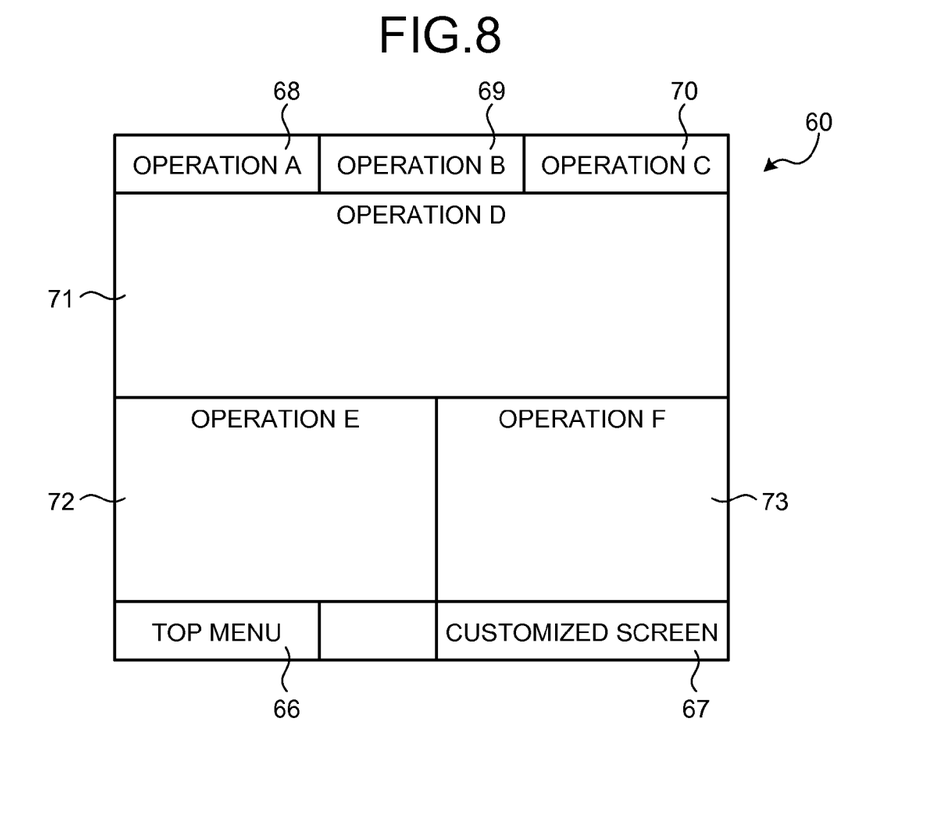
FIG. 8 is a diagram illustrating an example of a screen layout according to the present embodiment.

Next, the details of the screen layout of the standard screen 60 are explained with reference to FIG. 8. FIG. 8 is a diagram illustrating an example of a screen layout according to the present embodiment.

As explained with reference to FIG. 5, it has been explained that the central display area of the standard screen 60 has the two divided areas of the variable setting area 61 and the display area 62 related to job contents. However, the present embodiment is not limited to this.

For example, as illustrated in FIG. 8, the central display area of the standard screen 60 may be divided into three areas that correspond to predetermined operation items (operation D 71, operation E 72, and operation F 73). In this case, which of the display areas a desired operation item is displayed on can be previously set by the user.

Then, the display switching unit 15b displays the standard screen 60 in accordance with the layout set by the user. Moreover, the user can assign desired operations to the upper submenu buttons (operation A 68 to operation C 70) of the standard screen 60 and the lower menu button and one-touch button of the standard screen 60.

In this way, the robot system 1 according to the present embodiment can also change the layout of the standard screen 60 that is a general-purpose screen in addition to the customized screen 50. As a result, the robot system 1 according to the present embodiment can improve operationality of a user by raising degrees of freedom of the user.

Meanwhile, when a central processing unit (CPU) is occupied by the application created by the user, that is to say, the process executed by the customized screen application 16 during actuating the robot 30, it is concerned that the operation of the robot 30 is delayed. Therefore, the robot system 1 according to the present embodiment monitors whether the process on the customized screen 50 operates normally.

Figure 9:
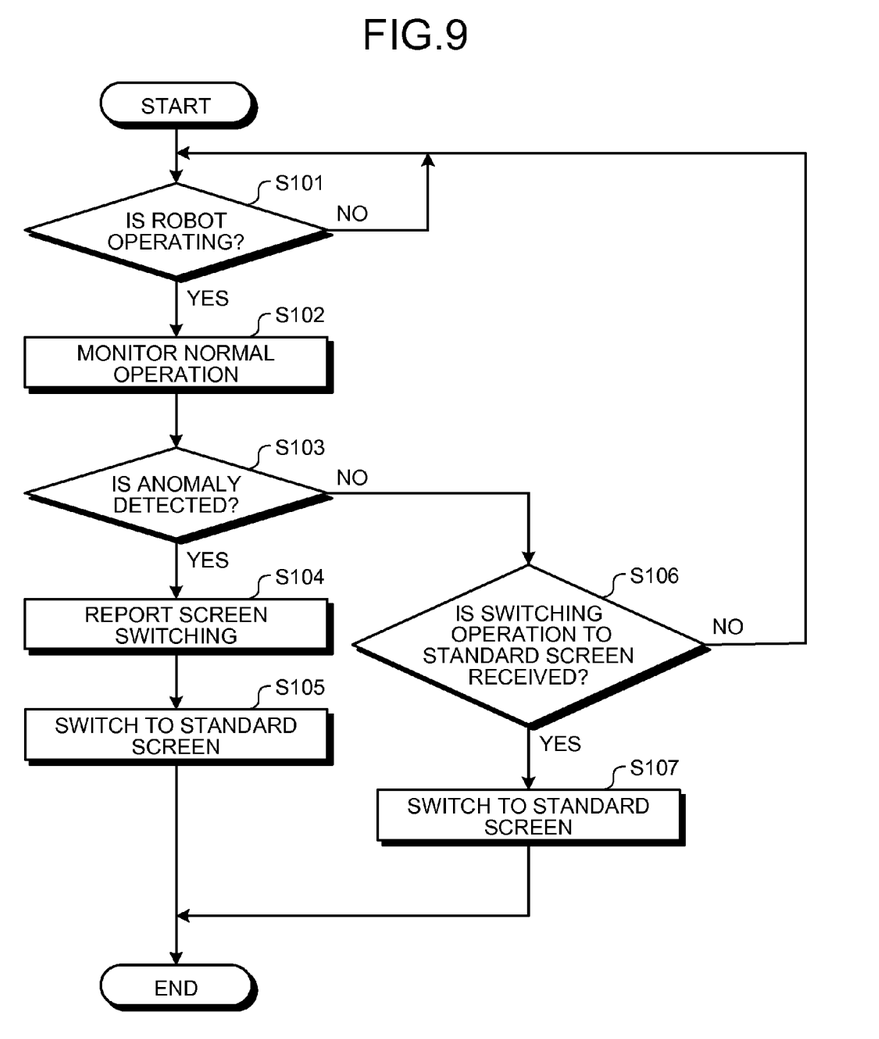
FIG. 9 is a flowchart illustrating the routine of a screen switching process according to the present embodiment.

Hereinafter, the routine of a screen switching process that includes a process for monitoring the process performed by the portable remote operating device 10 is explained with reference to FIG. 9. FIG. 9 is a flowchart illustrating the routine of a screen switching process according to the present embodiment.

As illustrated in FIG. 9, the process processing unit 15c of the standard screen application 15 determines whether the robot 30 is operating (Step S101).

When the robot 30 is operating (Step S101: Yes), the process processing unit 15c monitors whether the process executed by the customized screen application 16 operates normally (Step S102). On the other hand, when the robot 30 is not operating (Step S101: No), the process processing unit 15c repeats the determination process of Step S101.

The process processing unit 15c determines whether the customized screen application 16 has some kind of anomaly (Step S103). Then, when it is determined that the customized screen application 16 has some kind of anomaly (Step S103: Yes), the process processing unit 15c reports the effect that the screen is forcibly switched to the standard screen 60 to the display unit 11 (Step S104). The display switching unit 15b switches the present screen to the standard screen 60 (Step S105) and terminates a series of screen switching processes.

When the process processing unit 15c determines that the customized screen application 16 does not have any anomaly (Step S103: No), the display switching unit 15b determines whether the switching operation to the standard screen 60 is received from the customized screen application 16 (Step S106).

When the switching operation to the standard screen 60 is received (Step S106: Yes), the display switching unit 15b switches the present screen to the standard screen 60 (Step S107) and terminates the series of screen switching processes.

On the other hand, when the switching operation to the standard screen 60 is not received (Step S106: No), the process processing unit 15c shifts the process to Step S101 to repeat the screen switching processes.

In this way, when the robot 30 has some kind of failure during operating, because the portable remote operating device 10 can switch the present screen to the standard screen 60 and perform operations by using the standard screen 60, the user can quickly respond to the failure. Therefore, the robot system 1 according to the present embodiment can minimize the impact on the operations of the robot 30.

As described above, according to the present embodiment, customized screens can be independently created by a user and further applications created by the user can be easily operated. Moreover, according to the present embodiment, switching is performed between the customized screen and the standard screen at a predetermined time. As a result, operationality of the user can be improved by raising degrees of freedom of the user.

Furthermore, according to the present embodiment, display/nondisplay (or validity/invalidity of operation) of operation items on the customized screen are automatically switched in accordance with a security mode associated with a user during login. As a result, a user without authority is prevented from inappropriately accessing the customized screen and thus security and robustness of the robot system can be guaranteed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A robot system comprising:
   a robot;
   a robot controller that controls an operation of the robot on the basis of teaching data for instructing the robot to perform a predetermined operation; and
   a portable remote operating device that is connected to the robot controller, and
   the portable remote operating device including:
      a display unit that displays a screen for controlling the operation of the robot;
      an acquiring unit that acquires a process for receiving and transmitting information from and to the robot controller and a customized screen corresponding to the reception/transmission process that are created by a user; and
      a display switching unit that switches between the customized screen and a previously-prepared standard screen at a predetermined time during the operation of the robot,
   wherein the display switching unit switches, when detecting anomaly caused by executing the reception/transmission process associated with an operation item on the customized screen during the operation of the robot, the customized screen to the standard screen.

2. The robot system according to claim 1, wherein the display switching unit switches, when receiving a switching operation from the customized screen to the standard screen, the customized screen to the standard screen.

3. The robot system according to claim 2, further comprising a computer device that communicates with the portable remote operating device, and
   a computer device creates the reception/transmission process and the customized screen by the user, transfers the reception/transmission process and the customized screen created by the user to the portable remote operating device, and evaluates whether reception and transmission of information between the portable remote operating device and the robot controller are normally performed by the reception/transmission process executed by the portable remote operating device.

4. The robot system according to claim 1, wherein
   the portable remote operating device further includes a mode information storage unit that stores information, which indicates whether an operation is permitted for each the operation item, as mode information in association with a mode that indicates a level of authority of the user, and
   the display switching unit switches between display and nondisplay of the operation item on the basis of the mode information stored in the mode information storage unit or switches between validity and invalidity for an operation of the operation item in a state where the display of the operation item is maintained.

5. The robot system according to claim 4, further comprising a computer device that communicates with the portable remote operating device, and
   the computer device creates the reception/transmission process and the customized screen by the user, transfers the reception/transmission process and the customized screen created by the user to the portable remote operating device, and evaluates whether reception and transmission of information between the portable remote operating device and the robot controller are normally performed by the reception/transmission process executed by the portable remote operating device.

6. The robot system according to claim 1, further comprising a computer device that communicates with the portable remote operating device, and
   the computer device creates the reception/transmission process and the customized screen by the user, transfers the reception/transmission process and the customized screen created by the user to the portable remote operating device, and evaluates whether reception and transmission of information between the portable remote operating device and the robot controller are normally performed by the reception/transmission process executed by the portable remote operating device.

7. A robot system comprising:
   a robot;
   a robot controller that controls an operation of the robot on the basis of teaching data for instructing the robot to perform a predetermined operation; and
   a portable remote operating device that is connected to the robot controller, and
   the portable remote operating device including:
      a display unit that displays a screen for controlling the operation of the robot;
      an acquiring unit that acquires a process for receiving and transmitting information from and to the robot controller and a customized screen corresponding to the reception/transmission process that are created by a user; and
      a display switching unit that switches between the customized screen and a previously-prepared standard screen at a predetermined time during the operation of the robot,
   wherein the robot system further comprises a computer device that communicates with the portable remote operating device, and
   the computer device creates the reception/transmission process and the customized screen by the user, transfers the reception/transmission process and the customized screen created by the user to the portable remote operating device, and evaluates whether reception and transmission of information between the portable remote operating device and the robot controller are normally performed by the reception/transmission process executed by the portable remote operating device.

* * * * *